No. 740,074. PATENTED SEPT. 29, 1903.
L. M. ASPINWALL.
MULTIPLE CONTROL SYSTEM FOR RAILWAY VEHICLES OR TRAINS.
APPLICATION FILED FEB. 6, 1903.
NO MODEL.
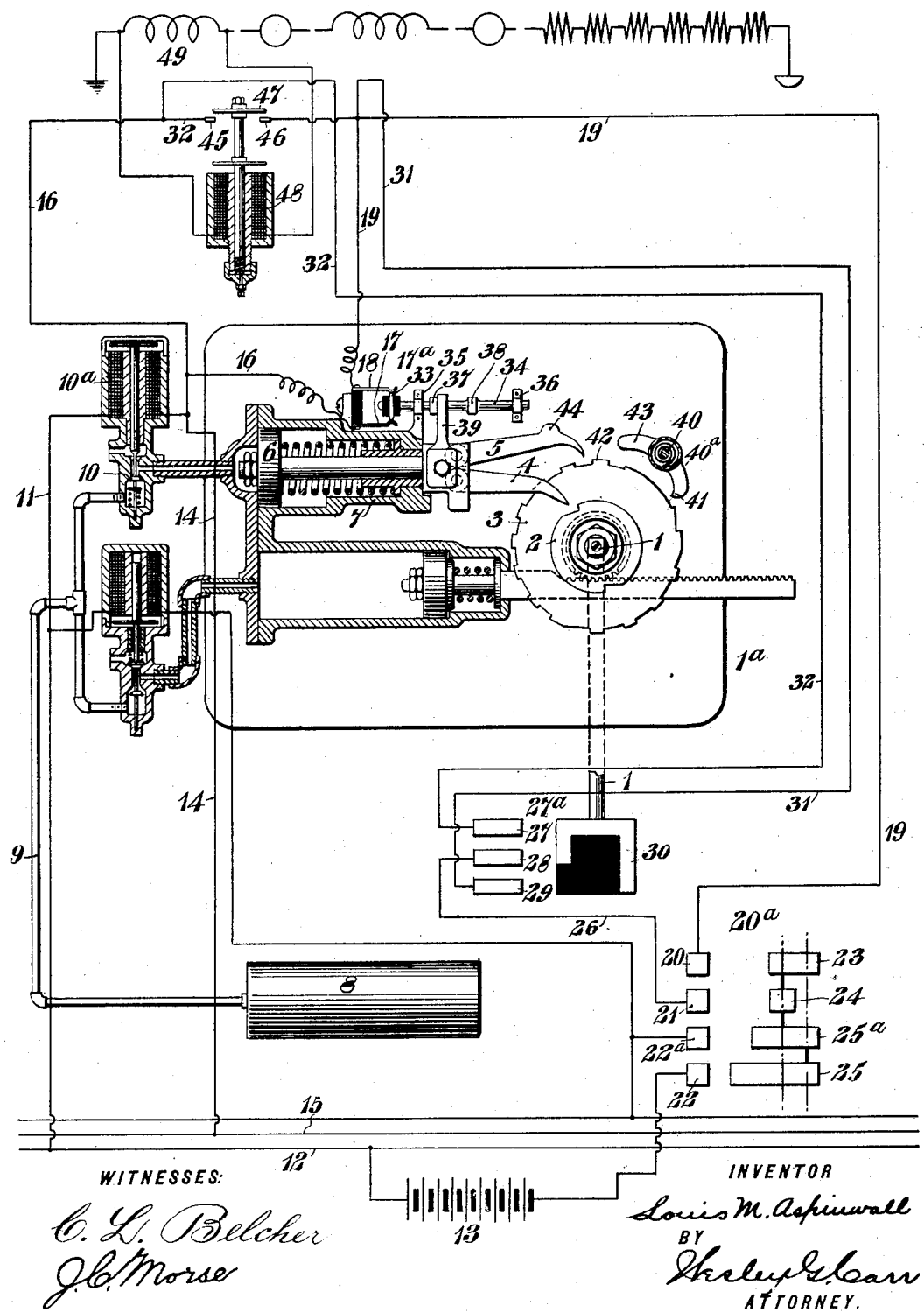
WITNESSES:
C. L. Belcher
J. C. Morse
INVENTOR
Louis M. Aspinwall
BY
Shirley G. Carr
ATTORNEY.

No. 740,074. Patented September 29, 1903.

UNITED STATES PATENT OFFICE.

LOUIS M. ASPINWALL, OF WILKINSBURG, PENNSYLVANIA, ASSIGNOR TO GEORGE WESTINGHOUSE, OF PITTSBURG, PENNSYLVANIA.

MULTIPLE-CONTROL SYSTEM FOR RAILWAY VEHICLES OR TRAINS.

SPECIFICATION forming part of Letters Patent No. 740,074, dated September 29, 1903.

Application filed February 6, 1903. Serial No. 142,238. (No model.)

*To all whom it may concern:*

Be it known that I, LOUIS M. ASPINWALL, a citizen of the United States, residing at Wilkinsburg, in the county of Allegheny and State of Pennsylvania, have invented a new and useful Improvement in Multiple-Control Systems for Railway Vehicles or Trains, of which the following is a specification.

This invention relates to electropneumatic controlling systems for electrically-propelled railway-vehicles. In these systems the motor-controller is arranged to be operated by means of air under pressure, the admission of the compressed air to the operating and releasing cylinders of the controller-actuating mechanism being regulated by electromagnetic means, which are governed by means of a hand-operated governing-switch. Systems of this kind are now well known in which a plurality of motor-controllers situated on either one vehicle or on a plurality of connected vehicles may be operated in synchronism from a governing-switch located at a single point on the vehicle or train of vehicles.

Arrangements are further known in which when the governing-switch is moved to a certain operative position the motor-controllers are caused to operate automatically step by step, and in the latest development known to me such operation is continued until the motors are connected in a predetermined manner, depending upon the position to which the governing-switch is moved, and in another position of the governing-switch the controllers are operated automatically until the motors are connected in a second predetermined manner.

In the case of controllers which severally control the connections of two electric motors, for example, the arrangement may be such that in one position of the governing-switch the controllers are actuated step by step until the motors controlled by each controller are connected in series without any resistance in circuit, and in another position of the governing-switch the controllers are actuated step by step until the motors controlled by each controller are connected in parallel without resistance.

One object of the invention is to provide improved means for insuring automatic step-by-step operation of each controller.

The invention further comprises an improved arrangement for stopping the automatic step-by-step movement of the controller at certain predetermined positions, and another object of the invention is to provide an improved device for stopping forward movement of the controller when the supply of current to the motors exceed a certain predetermined amount.

The accompanying drawing is a diagram illustrating a well-known form of electropneumatic controlling apparatus with my improvements applied thereto.

The apparatus comprises a motor-controller $1^a$ of the well-known drum type and constructed in any suitable manner. The operating-shaft 1 of the controller is provided with two ratchet-disks 2 3, adapted to be engaged by pawls 4 5, which are connected to a piston 6, that operates in a cylinder 7. Air under pressure is admitted to the cylinder 7 from a reservoir 8 through a pipe 9, such admission being governed by a valve 10, operated by an electromagnet $10^a$. The electromagnet $10^a$ is arranged to open the valve 10 when energized, and one terminal of its coil is connected, through a wire 11, to a battery-wire 12, which may extend through the train and be connected to one terminal of a battery 13. The other terminal of the coil of the electromagnet $10^a$ is connected by a wire 14 to a wire 15, which extends through the train, provided the invention is applied to a plurality of motor-cars which constitute parts of a train. The wire 14 is also connected to a wire 16, one end of which is connected to one stationary terminal 17 of a switch $17^a$, that may be called a "repeating-switch," the other stationary terminal 18 of said switch being connected to a wire 19, that leads to a fixed contact 20 of a manually-operated governing-switch $20^a$.

The governing-switch $20^a$, which is shown diagrammatically in the drawing, comprises four fixed contacts 20, 21, 22, and $22^a$, of which those marked 20 21 22 are important in connection with the present invention. The movable contacts of the governing-switch may be strips mounted on a drum and are indicated at 23, 24, 25, and $25^a$, these being all electrically connected together. The contacts 22ª and 25ª control the operation of the mechanism which acts to return the main controller-drum to off or zero position in the usual manner, such operation being well known to those skilled in the art. The fixed contact 22 is connected to one terminal of the battery 13, as shown, and the fixed contact 21 is connected, by means of a wire 26, to the fixed contact 28 of a switch 27ª, hereinafter called the "stopping-switch." Said stopping-switch is provided with three fixed contacts 27, 28, and 29 and a movable contact 30, which may be mounted upon a moving part of the motor-controller or upon a shaft which is connected by suitable gearing to the motor-controller shaft 1 in such a way that when the motors are connected in one predetermined manner (in series without resistance, for example) the contacts 27 and 28 are connected by the contact 30, and when the motors are connected in another predetermined manner (in parallel without resistance, for example) the contacts 27, 28, and 29 are connected by the contact 30. The contact 29 is connected to the terminal 18 of the repeating-switch by means of wires 31 and 19, and the contact 27 is connected, by means of a wire 32, with the wire 16, which is connected to the other terminal 17 of the repeating-switch. The movable contact of the repeating-switch consists of a bridge-piece 33, which is mounted upon a rod 34, that is adapted to slide in fixed bearings 35 36, said bar being provided with collars 37 38, which form stops to be engaged by a projection 39, carried on the rod of the piston 6.

Mounted upon a pivot 40 is a two-armed lever 40ª, one end of which is provided with a hook 41, adapted to engage with projections 42 on the disk 3, these projections being made square or being undercut on both sides in order that one side may be engaged by the pawl 5 and the other side by the hook 41. The other end 43 of the two-armed lever 40ª lies in the path of movement of a projection 44 on the pawl 5.

The device for preventing the operation of the controller when the supply of current to the motors exceeds a certain predetermined amount, which is hereinafter called the "limit-switch," comprises two fixed contacts 45 and 46, which are connected, respectively, to the wires 32 and 19, and a movable contact-piece 47, which is controlled by an electromagnet, the coil 48 of which is connected in shunt to the field-magnet 49 of one of the motors or otherwise arranged, so that when the supply of current to the motors reaches a predetermined limit the movable contact 47 is caused to connect the fixed contacts 45 and 46.

The operation of the invention is as follows: If the manually-operated governing-switch 20ª is moved so that the contacts 20, 21, 22ª, and 22 make connection, respectively, with the contacts 23, 24, 25ª, and 25, current will flow from the battery 13 through the wires 12 and 11, the electromagnet 10ª, the wire 14, the wire 16, contacts 17, 33, 18, wire 19, contact 20, contact 23, contact 25, and contact 22 back to the battery. The electromagnet 10ª is thus energized and operates the valve 10 to admit air under pressure from the reservoir 8 through the pipe 9 to the operating-cylinder 7, the piston 6 of which is thereby moved forward against its spring 6ª and through the pawls 4 and 5 and ratchet-disks 2 3 rotates the shaft 1 one step. When the piston 6 reaches the limit of its movement, the projection 44 on the pawl 5 engages with the end 43 of the lever 40ª and rotates said lever on its pivot 40 into a position where the hook 41 engages with the forward side of one of the projections 42. This limits the movement of the controller-drum to the degree which corresponds to the circuit connections desired. As the piston 6 is approaching the limit of its forward movement the projection 39 engages with the stop 38 and moves the bar 34 in its bearings 35 36 sufficiently to withdraw the movable contact 33 from the contacts 17 18 of the repeating-switch, and thus break the circuit of the magnet 10ª. The valve 10 is thereupon actuated so as to connect the cylinder 7 with the atmosphere, whereupon the piston 6 is moved by its spring 6ª in the opposite direction to its first movement and withdraws the pawls 4 and 5 from engagement with the ratchet-disks 2 and 3. The hook 41 of the lever 40ª is also withdrawn, by a suitable spring 43ª, from engagement with ratchet-disk 3. As the piston 6 approaches the limit of its backward movement the projection 39 engages with the stop 37 and moves the bar 34, so as to cause the movable contact 33 to again connect the fixed contacts 17 18, whereupon the magnet 10ª is again energized and the cycle of operation is repeated. The shaft 1 of the motor-controller will therefore be rotated step by step until it reaches such a position that the contact 30 on the stopping-switch connects the contacts 27 and 28, whereupon the repeating-switch will be short-circuited through wires 16 and 32, contacts 27, 30, and 28 of the stopping-switch, the wire 26, and contacts 21, 24, 25, and 22 of the governing-switch. It follows, therefore, that the circuit of the electromagnet 10ª will not be broken by the operation of the repeating-switch 17ª, and the forward movement of the controller will be stopped until the governing-switch is moved another step. If the manually-operated governing-switch be further operated, so that connection is broken between contacts 21 and 24, the repeating-switch 17ª will be short-circuited when the controller has moved to such a position that the contact 30 of the stopping-switch connects the contacts 27 and 29, and the forward movement of the controller is thereby stopped in another predetermined position.

It is clear that by increasing the number of contacts in the manually-operated governing-switch and correspondingly increasing the number of contacts in the stopping-switch the number of positions at which the forward movement of the controller will be stopped can be made greater than two, if desired. The shape and dimensions of the contact 30 of the stopping-switch and of the movable contacts of the governing-switch will of course be varied to correspond to the number of stationary contacts with which they are required to engage.

The operation of the limit-switch is as follows: If the current-supply to the electric motors rises to a predetermined limit, the magnet 48 is energized, and the contact 47 is thereby caused to connect the contacts 45 and 46 and through the wires 19 and 32 short-circuit the repeating-switch 17ª and stop the further forward movement of the controller.

If there are other cars in the train which are provided with controlling apparatus arranged in a similar manner to that shown in the drawing, the magnets of such apparatus corresponding to the magnet 10ª will be energized from the battery 13, the circuit being as follows: from the battery 13 through the contacts 22 25 23 20 of the manually-operated governing device, the wire 19, the repeating-switch 17ª, wire 16, wire 14, and wire 15, the electromagnets corresponding to the magnet 10ª on the other motor-cars, the wires on those cars corresponding to the wire 11, and the wire 12, which extends through the train, back to the battery 13. Consequently the energizing of the electromagnets corresponding to the magnet 10ª on all the motor-cars will be controlled by the repeating-switch 17ª on the car on which the manually-operated governing-switch is situated, and also the stopping of the forward movement of the controller will be in a similar manner governed by the stopping-switch 27ª and the limit-switch 45 46 47 on the car on which is located the manually-operated governing-switch.

The shapes of the parts may obviously be altered from what is shown in the drawing, and instead of operating lever 40ª by a projection 44 on the actuating-pawl 5 a projection carried on the rod of the piston 6 might be employed. The disk with which the locking-lever 40ª engages need not necessarily be the rachet-disk 3, as hereinbefore described, but may be some other disk secured to or rotated by the controlling-shaft 1. The construction of the repeating-switch and the manner of its operation may also be varied from what is shown in the drawing, provided the result attained is the same.

I claim as my invention—

1. In a controlling system for railway vehicles or trains, the combination with a controller-drum shaft having a ratchet-wheel, of a pneumatically-actuated pawl for operating said ratchet-wheel, an electromagnet for controlling and applying the pneumatic pressure, a switch in the circuit of said magnet and means connected to said pawl to open said switch as the pawl reaches the limit of its forward movement and to close the same as it reaches the limit of its rearward movement.

2. In a controlling system for railway vehicles or trains, the combination with a controller and a pneumatically-operated reciprocating means for imparting a rotative movement to the controller-drum shaft, an electromagnetically-actuated valve for applying the pneumatic pressure and a governing-circuit for the valve-actuating magnet having a switch that is respectively opened and closed by the forward and rearward movements of the drum-actuating mechanism.

3. In a controlling system for railway vehicles or trains, the combination with a controller and pneumatically-actuated mechanism for operating the same, of an electric governing-circuit for said mechanism having a switch that is engaged by said mechanism to positively and directly open and close the governing-circuit.

4. In a controlling system for railway vehicles or trains, the combination with a controller-drum shaft having a ratchet-wheel, a coöperating pawl pneumatically actuated in a forward direction and spring-actuated in a rearward direction, an electromagnet for applying the pneumatic pressure, a switch for the circuit of said magnet and means for mechanically opening said switch as the pawl is moved forwardly and for closing the switch as it is moved rearwardly.

5. In a controlling system for railway vehicles or trains, the combination with a controller and pneumatically-actuated mechanism for operating the same, of an electromagnet for applying the pneumatic pressure and a switch for the circuit of said magnet the movable member of which is directly and mechanically actuated by the controller-operating mechanism.

6. In a controlling system for railway vehicles or trains, the combination with a pneumatically-actuated controller-operating mechanism, of an electromagnet for applying the pneumatic pressure, a repeating-switch actuated directly and positively by the controller-operating mechanism to open and close the circuit of said electromagnet, a manually-operated governing-switch and a controller-operated stopping-switch that establishes a short circuit around the repeating-switch when the controller reaches a predetermined position.

7. In a controlling system for railway vehicles or trains, the combination with controller-operating mechanism, of an electric governing-circuit for said mechanism having a repeating-switch that is actuated directly and positively by the controller-operating mechanism, a manually-operated governing-switch and a controller-operating stopping-switch that establishes a short circuit around the repeating-switch when the controller reaches a certain predetermined position.

8. In a controlling system for railway vehicles or trains, the combination with controller-operating mechanism and a governing-circuit having a make-and-break switch that is operated by the controller-operating mechanism, of a manually-operated governing-switch and a stopping-switch that is operated directly by the controller and serves to short-circuit the make-and-break switch in full series position and in full multiple position.

9. In a controlling system for railway vehicles or trains, the combination with a controller-operating means and a governing-circuit therefor, of a repeating-switch for automatically making and breaking said circuit, a switch for short-circuiting said repeating-switch and an electromagnet for closing said short-circuiting switch when the motor-current becomes excessive.

10. In a controlling system for railway vehicles or trains, the combination with controller-operating mechanism and a governing-circuit therefor, of a repeating-switch for automatically making and breaking said governing-circuit, a switch for short-circuiting said repeating-switch and an actuating-magnet for said short-circuiting switch that is so connected to the motor-circuit as to be operatively energized by a predetermined excessive current in said motor-circuit.

In testimony whereof I have hereunto subscribed my name this 3d day of February, 1903.

LOUIS M. ASPINWALL.

Witnesses:
JAMES B. YOUNG,
BIRNEY HINES.